(12) United States Patent
Staring

(10) Patent No.: US 11,664,687 B2
(45) Date of Patent: May 30, 2023

(54) WIRELESS POWER TRANSFER

(71) Applicant: KONINKLIJKE PHILIPS N.V., Eindhoven (NL)

(72) Inventor: Antonius Adriaan Maria Staring, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 17/422,778

(22) PCT Filed: Jan. 2, 2020

(86) PCT No.: PCT/EP2020/050003
§ 371 (c)(1),
(2) Date: Jul. 14, 2021

(87) PCT Pub. No.: WO2020/148096
PCT Pub. Date: Jul. 23, 2020

(65) Prior Publication Data
US 2022/0077721 A1    Mar. 10, 2022

(30) Foreign Application Priority Data
Jan. 16, 2019    (EP) .................................... 19152176

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS

2014/0139034 A1* 5/2014 Sankar ................... H02J 50/12
                                                            307/104
2014/0306650 A1   10/2014 Akiyoshi et al.
(Continued)

FOREIGN PATENT DOCUMENTS

WO    2014171774 A1    10/2014

OTHER PUBLICATIONS

International Search Report and Written Opinion from PCT/EP2020/050003 dated Jul. 23, 2020.

Primary Examiner — Rexford N Barnie
Assistant Examiner — Joseph N Inge

(57) ABSTRACT

A power transmitter (101) provides power to a power receiver (105) via an electromagnetic power transfer signal. The power transmitter (101) comprises an output circuit (302, 103) with a transmitter coil (103) generating the power transfer signal in response to a drive signal generated by a driver (301). A configuration controller (303) switches between power transfer configurations having different maximum power limits and voltage amplitudes for the drive signal. A transmitter (307) transmits a power configuration message to the power receiver (105) comprising data indicative of a voltage amplitude for a first power transfer configuration a receiver (305) receives a power transfer configuration change request message from the power receiver (105). The configuration controller (303) switches the power transmitter (101) to the first power transfer configuration in response to the power transfer configuration change request message. The approach allows a power transmitter and receiver to collaborate to change power transfer configurations providing different maximum power limits.

20 Claims, 9 Drawing Sheets

(56) References Cited

U.S. PATENT DOCUMENTS

| | | |
|---|---|---|
| 2015/0079934 A1 | 3/2015 | Kobayashi et al. |
| 2016/0268833 A1 | 9/2016 | Lee et al. |
| 2016/0380467 A1* | 12/2016 | Shao ................. H02J 50/12 320/108 |
| 2017/0093222 A1* | 3/2017 | Joye ................. H02J 50/12 |
| 2017/0117752 A1 | 4/2017 | Kaechi |
| 2018/0138757 A1 | 5/2018 | Ikefuji |

* cited by examiner

| $B_0$ | $b_7$ | $b_6$ | $b_5$ | $b_4$ | $b_3$ | $b_2$ | $b_1$ | $b_0$ |
|---|---|---|---|---|---|---|---|---|
| | Reserved | | | | | | | Dir |

FIG. 8

WIRELESS POWER TRANSFER

CROSS-REFERENCE TO PRIOR APPLICATIONS

This application is the U.S. National Phase application under 35 U.S.C. § 371 of International Application No. PCT/EP2020/050003, filed on Jan. 2, 2020, which claims the benefit of EP Patent Application No. EP 19152176.4, filed on Jan. 16, 2019. These applications are hereby incorporated by reference herein.

FIELD OF THE INVENTION

The invention relates to operation of a wireless power transfer system and in particular, but not exclusively, to approaches for supporting higher power levels in a wireless power transfer system such as Qi.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply where power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Qi originally in version 1.0 defined low power wireless power transfer which in practice was limited to lower power levels below 5 W. This has been extended to higher power levels in subsequent versions, and version 1.2. e.g. providing compliance testing addressed at power levels up to 15 W.

However, it is desired to support even higher power levels and proprietary solutions have been introduced in some cases in order to achieve this. However, most suggested approaches for supporting high power level wireless power transfer tend to be suboptimal and a number of challenges or undesired effects can occur. For example, supporting a large power range is challenging. E.g. variations in the provided power may be difficult to control over a large range merely by adjusting or limiting current being provided to a power transmitter coil. Another challenge is to ensure that the effects and consequences of changing operating parameters and conditions e.g. when changing power levels are acceptable and e.g. can be handled by the power receiver. For example, a substantial and quick change in the drive voltage may result in a transient in the voltage induced at the power receiver thereby potentially causing an overvoltage (or undervoltage) situation.

Hence, an improved approach for wireless power transfer would be advantageous, in particular, an approach allowing increased flexibility, reduced cost, reduced complexity, improved support for large power ranges, improved transient power performance, improved adaptability, backwards compatibility, improved power transfer operation, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an electromagnetic power transfer signal; the power transmitter comprising: a transmitter coil for generating the power transfer signal in response to a drive signal being applied to the transmitter coil; a driver for generating the drive signal; a configuration controller for switching between a set of power transfer configurations, the power transfer configurations of the set of power transfer configurations having different combinations of a maximum power limit and a voltage amplitude for the drive signal; a transmitter for transmitting a power configuration message to the power receiver, the power configuration message comprising data indicative of a voltage amplitude for a first power transfer configuration of the set of power transfer configurations; a receiver for receiving a power transfer configuration change request message from the power receiver; and wherein the configuration controller is arranged to switch the power transmitter to the first power transfer configuration in response to the power transfer configuration change request message.

The invention may provide improved performance and/or improved power transfer in many scenarios. It may in many embodiments allow an improved and more efficient power transfer over a large range of power levels. The approach may in many embodiments support, enable, improve, or facilitate high power wireless power transfer.

In many embodiments, an improved switching between different power transfer configurations may be achieved, and in particular the impact of transient conditions and changes in the power transfer parameters may often be mitigated. Specifically, in many embodiments and scenarios, improved transient undervoltage/overvoltage operation may be achieved.

The set of power transfer configurations may have different combinations of a maximum power limit and a voltage amplitude for the drive signal in the sense that at least one of a maximum power limit and a voltage amplitude is different for different power transfer configurations of the set of power transfer configurations.

The first power transfer configuration is a candidate power transfer configuration. The first power transfer configuration is different from a current power transfer configuration (being the power transfer configuration the power transmitter is currently working in).

The configuration controller may be arranged to switch the power transmitter from a current power transfer configuration to the first power transfer configuration in response to the power transfer configuration change request message. The configuration controller may be arranged to switch the power transmitter to the first power transfer configuration in response to receiving the power transfer configuration change request message. The power transfer configuration change request message may request a change from a current power transfer mode to the first power transfer mode.

The output circuit may comprise or consist in a resonance (or tank) circuit comprising the transmitter coil. The transmitter coil may be a resonating component of the resonance circuit. The resonance circuit may be a series resonance circuit or a parallel resonance circuit. The resonance circuit may include one or more capacitors.

The voltage amplitude may e.g. be a peak-to-peak voltage amplitude, a peak amplitude and/or a semi-amplitude. In some embodiments, and for some signals, the voltage amplitude may for example be an effective or root-mean square amplitude.

The voltage amplitude for a power transfer configuration may be a constant voltage amplitude for the drive signal. The power transmitter may be arranged to control a power level of the power transfer signal by varying at least one of a frequency, duty cycle and a current amplitude of the drive signal. The voltage amplitude may be constant/fixed for a given power transfer configuration.

In some embodiments, the voltage amplitude for a power transfer configuration may be a range of the voltage amplitude for the drive signal. For example, the voltage amplitude for each power transfer configuration may be a maximum voltage amplitude limit and/or a minimum voltage amplitude limit. In some embodiments, the voltage amplitude for the first power transfer configuration provided in the power configuration message may be an indication of a voltage amplitude range and/or a maximum/minimum voltage amplitude limit for the first power transfer configuration. In some embodiments, the voltage amplitude for the first power transfer configuration provided in the power configuration message may be an indication of a nominal or initial voltage amplitude for the drive signal after switching to the first power transfer configuration.

In accordance with an optional feature of the invention, the data is indicative of a relative difference between the voltage amplitude for the first power transfer configuration and a voltage amplitude for a current power transfer configuration.

This may provide improved performance in many embodiments. It may allow a more efficient trade-off between accuracy and communication bandwidth in many embodiments, and may provide particularly relevant information for the transient performance when changing power transfer configurations.

In accordance with an optional feature of the invention, the data is indicative of a ratio between the voltage amplitude for the first power transfer configuration and the voltage amplitude for the current power transfer configuration.

This may provide improved performance in many embodiments. It may allow a more efficient trade-off between accuracy and communication bandwidth in many embodiments and may provide particularly relevant information for the transient performance when changing power transfer configurations.

In accordance with an optional feature of the invention, the first power transfer configuration is a power transfer configuration of the set of power transfer configurations having a maximum power limit being at least one of the next higher maximum power limit and the next lower maximum power limit for a maximum power limit of a current power transfer configuration.

This may provide particularly efficient operation in many embodiments. It may particularly provide an efficient approach for controlling dynamic power level variation which may support a large range of power levels yet maintain low communication requirements. It may restrict the power level changes to reduce transient properties and/or reduce the communication requirement e.g. by enabling that no further information than the voltage amplitude need to be provided for candidate power transfer configurations.

In accordance with an optional feature of the invention, the power configuration message comprises data indicative of a voltage amplitude for a second power transfer configuration of the set of power transfer configurations, the first power transfer configuration being a power transfer configuration of the set of power transfer configurations having a maximum power limit being a next higher maximum power limit for a maximum power limit of a current power transfer configuration and the second power transfer configuration being a power transfer configuration of the set of power transfer configurations having a maximum power limit being the next lower maximum power limit for the maximum power limit of the current power transfer configuration.

This may provide particularly efficient operation in many embodiments. The power mode message may specifically provide the information for the closest (in terms of maximum power limit) power transfer configurations available to the power transmitter for respectively increasing and decreasing the power level.

In accordance with an optional feature of the invention, a predetermined value of the data indicative of the voltage amplitude indicates that the set of power transfer configurations does not comprise a power transfer configuration that has a higher maximum power limit than a maximum power limit of a current power transfer configuration.

This may allow a particularly efficient communication of the availability of power transfer configurations.

In some embodiments, a predetermined value of the data indicative of the voltage amplitude indicates that the set of power transfer configurations does not comprise a power transfer configuration that has a lower maximum power limit than a maximum power limit of a current power transfer configuration.

This may allow a particularly efficient communication of the availability of power transfer configurations.

In some embodiments, a predetermined value of the data indicative of the voltage amplitude is indicative of there being no change in the voltage amplitude for the first power transfer configuration relative to a voltage amplitude for a current power transfer configuration.

In accordance with an optional feature of the invention, the configuration controller is arranged to transmit the power configuration message in response to a detection that an operating characteristic of the power transfer meets a criterion.

This may provide a particularly advantageous performance and operation in many embodiments. The approach may support power transmitter initiated change of the power transfer configuration while ensuring that this is done in collaboration with the power receiver thereby reducing the risk of undesired effects at the power receiver.

The operating characteristics of the power transfer may specifically be a parameter indicative of a current power level of the power transfer signal (for the current power transfer configuration), such as e.g. a parameter indicative of a frequency or a current of the drive signal.

In accordance with an optional feature of the invention, the configuration controller is arranged to transmit the power configuration message in response to a detection that a current power level of the power transmitter exceeds a threshold, the threshold being dependent on a maximum power limit of a current power transfer configuration.

This may provide a particularly advantageous performance and operation in many embodiments. The approach may support power transmitter initiated change of the power transfer configuration while ensuring that this is done in collaboration with the power receiver thereby reducing the risk of undesired effects at the power receiver.

In accordance with an optional feature of the invention, the configuration controller is arranged to transmit the power configuration message in response to receiving a power configuration information request message from the power receiver.

This may provide a particularly advantageous performance and operation in many embodiments. The approach may support power receiver initiated change of the power transfer configuration while ensuring that this is done in collaboration with the power transmitter.

In accordance with an optional feature of the invention, the configuration controller is arranged to switch the power transmitter to the first power transfer configuration after having transmitted an acknowledgement message to the power receiver, the acknowledgement message acknowledging a request message received from the power receiver.

This may provide a particularly advantageous performance and operation in many embodiments.

According to an aspect of the invention there is provided a power receiver for wirelessly receiving power from a power transmitter via an electromagnetic power transfer signal, the power receiver comprising: an input circuit comprising a power receiver coil arranged to extract power from the power transfer signal; a receiver for receiving a power configuration message from the power transmitter, the power configuration message comprising data indicative of a voltage amplitude of a drive signal for at least a first power transfer configuration of a set of power transfer configurations, the power transfer configurations of the set of power transfer configurations having different combinations of a maximum power limit and a voltage amplitude and the drive signal being for an output circuit of the power transmitter comprising a transmitter coil for generating the power transfer signal in response to the drive signal being applied to the output circuit; a configuration controller arranged to detect a power transfer configuration change preference for the power transmitter to switch to the first power transfer configuration; and a transmitter for transmitting a power transfer configuration change request message to the power transmitter in response to the detection of the power transfer configuration change preference, the power transfer configuration change request message comprising a request for the power transmitter to switch to the first power transfer configuration.

In accordance with an optional feature of the invention, the configuration controller is arranged to control the power transfer to change a voltage induced over the power receiver coil in advance of a change in power transfer configuration to the first power transfer configuration.

This may provide a particularly advantageous performance and operation in many embodiments. It may in many scenarios compensate or mitigate transient voltage variations and e.g. prevent undervoltage or overvoltage conditions.

In accordance with an optional feature of the invention, the configuration controller is arranged to change a load impedance for the power receiver coil in advance of a change in power transfer configuration to the first power transfer configuration.

This may provide a particularly advantageous performance and operation in many embodiments.

According to an aspect of the invention there is provided a method of operation of a power transmitter wirelessly providing power to a power receiver via an electromagnetic power transfer signal; the method comprising: a transmitter coil generating the power transfer signal in response to a drive signal being applied to the transmitter coil; generating the drive signal; switching between a set of power transfer configurations, the power transfer configurations of the set of power transfer configurations having different combinations of a maximum power limit and a voltage amplitude for the drive signal; transmitting a power configuration message to the power receiver, the power configuration message comprising data indicative of a voltage amplitude for a first power transfer configuration of the set of power transfer configurations; receiving a power transfer configuration change request message from the power receiver; and wherein the switching between the set of power transfer configurations switches the power transmitter to the first power transfer configuration in response to the power transfer configuration change request message.

According to an aspect of the invention there is provided a method of operation of a power receiver wirelessly receiving power from a power transmitter via an electromagnetic power transfer signal, the method comprising: a power receiver coil extracting power from the power transfer signal; receiving a power configuration message from the power transmitter, the power configuration message comprising data indicative of a voltage amplitude of a drive signal for at least a first power transfer configuration of a set of power transfer configurations, the power transfer configurations of the set of power transfer configurations having different combinations of a maximum power limit and a voltage amplitude and the drive signal being for an output circuit of the power transmitter comprising a transmitter coil for generating the power transfer signal in response to the drive signal being applied to the output circuit; detecting a power transfer configuration change preference for the power transmitter to switch to the first power transfer configuration; and transmitting a power transfer configuration change request message to the power transmitter in response to the detection of the power transfer configuration change preference, the power transfer configuration change request message comprising a request for the power transmitter to switch to the first power transfer configuration.

According to another aspect of the invention, there is provided a wireless power transfer system for wirelessly providing power to a power receiver from a power transmitter via an electromagnetic power transfer signal; the power transmitter comprising: an output circuit comprising a transmitter coil for generating the power transfer signal in response to a drive signal being applied to the output circuit; a driver for generating the drive signal; a configuration controller for switching between a set of power transfer configurations, the power transfer configurations of the set of power transfer configurations having different combinations of a maximum power limit and a voltage amplitude for the drive signal; a transmitter for transmitting a power configuration message to the power receiver, the power configuration message comprising data indicative of a voltage amplitude for a first power transfer configuration of the set of power transfer configurations; a receiver for receiving a power transfer configuration change request message from the power receiver; and wherein the configuration controller is arranged to switch the power transmitter to the first power transfer configuration in response to the power transfer configuration change request message; and the power receiver comprising: an input circuit comprising a power receiver coil arranged to extract power from the power transfer signal; a receiver for receiving the power configuration message from the power transmitter, a configuration controller arranged to detect a power transfer configuration change preference for the power transmitter to switch to the first power transfer configuration; and a transmitter for transmitting the power transfer configuration change request message to the power transmitter in response to the detection of the power transfer configuration change preference, the power transfer configuration change request message comprising a request for the power transmitter to switch to the first power transfer configuration.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 8 illustrates an example of a power transfer configuration change request message in accordance with some embodiments of the invention;

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
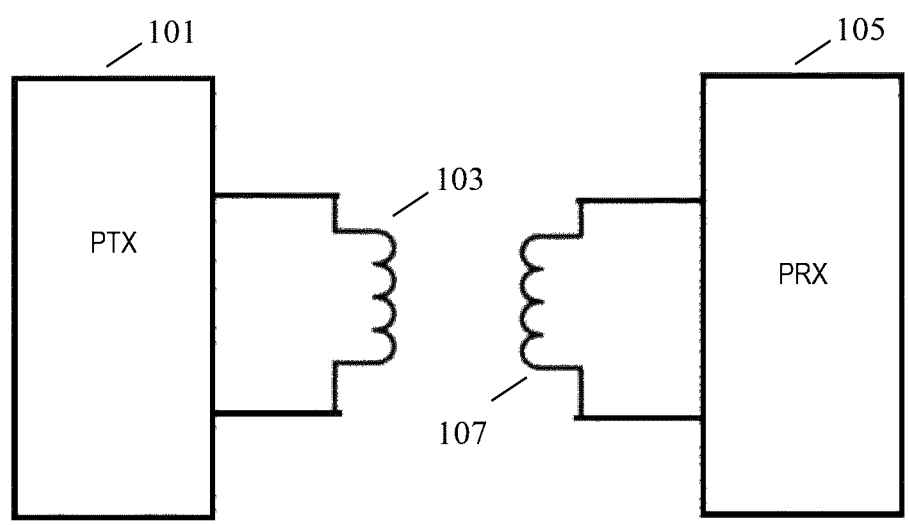
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103 (which is typically part of an output circuit in the form of a resonance or tank circuit). The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receiver coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal).

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the baseline power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

The system of FIG. 1 is arranged to support power transfer with a large range of power levels. The system supports this by the power transmitter being able to operate in a plurality of different power transfer configurations with these corresponding to different power levels.

Specifically, some of power transfer configurations use different voltage amplitudes for driving output circuit with the transmitter coil 103. Conventionally, the output circuit is a series resonance circuit with the transmitter coil 103 forming the inductive resonating component and with the series resonance circuit being driven by a drive signal with a constant voltage amplitude and with the power level being determined and varied by varying the current provided to the output circuit, either directly or indirectly, e.g. by varying a drive frequency or duty cycle of the drive signal. However, large power level variations become difficult to support in this way as the required variation in the current becomes difficult to achieve and control. Accordingly, the system of FIG. 1 allows the power transmitter 101 to switch between different power transfer configurations which may correspond to different maximum power limits and use different voltage amplitudes for the drive signal to the transmitter coil 103. Specifically, for a given power transfer configuration, the voltage amplitude of the drive signal may be constant but the voltage amplitude may be different for different power transfer configurations. The maximum power limit may be an upper limit on the power of power transfer signal that is supported when in the current power transfer configuration. The power limit may be imposed by restricting a current of the drive signal provided to the transmitter coil 103. Thus, a maximum power limit may correspond to a maximum current limit.

The voltage amplitude may be a peak-to-peak, a peak, or a semi-amplitude for the drive signal, and the drive signal may in many embodiments be a square wave or a rectangular wave. Specifically, the drive signal may be a signal which has a value of either +Va, −Voltage amplitude, or 0, where Va is the (peak) voltage amplitude. The drive signal may have mean of 0. In some embodiments, the drive signal may be a different waveform such as e.g. a sine wave, a triangular wave etc.

Figure 2:
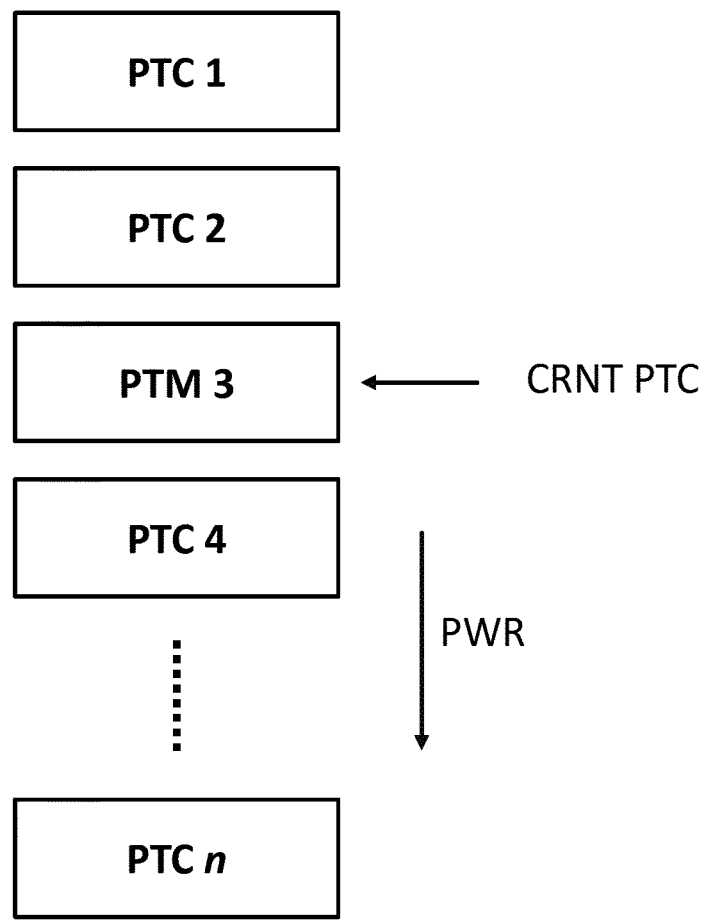
FIG. 2 illustrates an example of a set of power transfer configurations for a power transmitter in accordance with some embodiments of the invention.

Thus, the power transmitter 101 may be arranged to operate in one of a plurality of power transfer configurations where each power transfer configuration specifically may correspond to a different combination of a drive signal voltage amplitude and a maximum power limit (and thus a maximum current limit). For example, is illustrated in FIG. 2, the power transmitter 101 may be arranged to operate in one out of n different power transfer configurations with each configuration having an associated maximum power limit and a fixed drive signal voltage amplitude. For example, the power transmitter 101 may be arranged to select a current power transfer configuration from a set of power transfer configurations having the following maximum power limits/maximum current limits and drive signal voltage amplitudes (in the example the effective values of the voltage amplitude and maximum current limit are provided).

5 V, 1.5 A (7.5 W)
9V, 1 A (9 W)
5 V, 2 A (10 W)
12 V, 1 A (12 W)
9 V, 2 A (18 W)
12 V, 1.5 A (18 W)
19 V, 1 A (19 W)
12 V, 2 A (24 W)
19 V, 2 A (38 W)
19 V, 3 A (57 W)

The power transmitter 101 may thus be arranged to operate in one of a set of power transfer configurations with different voltage amplitudes, where higher voltage amplitudes are needed to achieve higher power levels.

Figure 3:
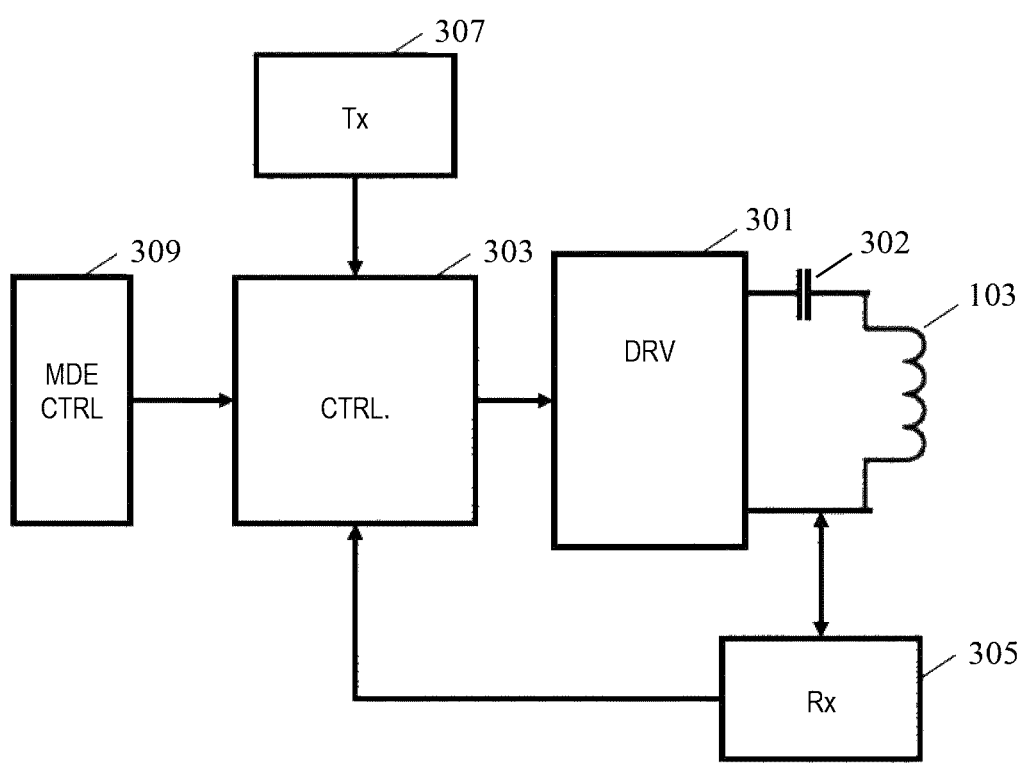
FIG. 3 illustrates an example of elements of a power transmitter in accordance with some embodiments of the invention.

FIG. 3 illustrates elements of the power transmitter 101 of FIG. 1 in more detail.

The power transmitter 101 includes a driver 301 which can generate a drive signal that is fed to an output circuit which in the example is a resonance circuit formed by the transmitter coil 103 and a transmitter capacitor 302. The transmitter coil 103 in return to being driven by the drive signal generates an electromagnetic field and thus the electromagnetic power transfer signal which provides power transfer to the power receiver 105. The power transfer signal is provided (at least) during a power transfer phase.

Figure 4:
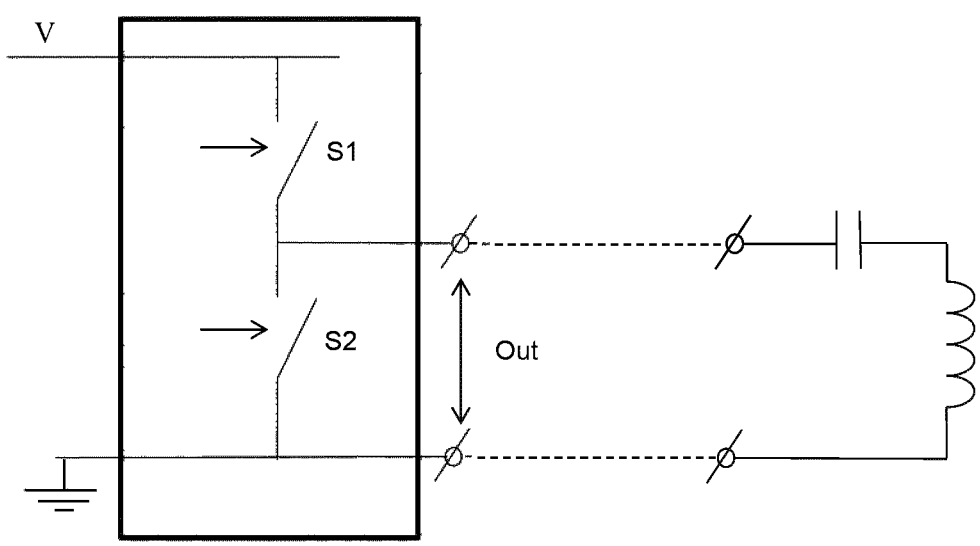
FIG. 4 illustrates an example of elements of an output stage of a power transmitter.
Figure 5:
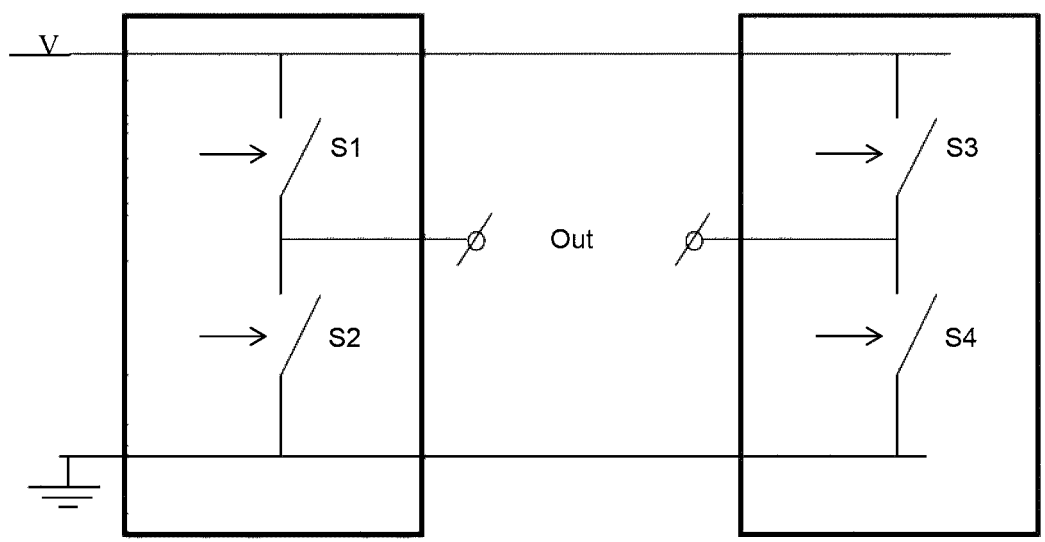
FIG. 5 illustrates an example of elements of an output stage of a power transmitter.

The driver 301 is typically a drive circuit in the form of an inverter which generates an alternating signal from a DC Voltage. The output of the driver 301 is typically a switch bridge generating the drive signal by the appropriate switching of switches of the switch bridge. FIG. 4 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 5 shows a full-bridge switch bridge/inverter. The switches S1 and S2 are controlled such that they are never closed at the same time. The switches S3 and S4 are controlled such that they are never closed at the same time.

Alternatingly switches S1 and S4 are closed while S2 and S3 are open, and then S2 and S3 are closed while S1 and S4 or open, thereby creating a square-wave signal at the output. The switches are open and closed with the desired frequency.

The driver 301 thus generates a drive signal for the output resonance circuit and thus for the transmitter coil 103. The drive signal has a (substantially) constant voltage amplitude for a given power transfer configuration. In the example, the constant voltage amplitude is achieved by setting a constant rail voltage for the output circuit of the driver, i.e. the rail voltage V for the bridges of FIGS. 4 and 5 is constant for a given power transfer configuration. The switching by the bridge transistors respectively switches the output voltage between 0 and V for the half bridge and between V and −V for the full bridge. Thus, in the example the power transmitter may set the rail voltage to be constant for any given power transfer configuration but to (possibly) vary between power transfer configurations.

The power transmitter 101 further comprises a power transmitter controller 303 which is arranged to control the operation of the power transmitter 101 in accordance with the desired operating principles. Specifically, the power transmitter 101 may include many of the functionalities required to perform power control in accordance with the Qi Specifications.

The power transmitter controller 303 is in particular arranged to control the generation of the drive signal by the driver 301. The power transmitter controller 303 may specifically set the rail voltage for the drive corresponding to the specific power transfer configuration in which the power transmitter is currently operating.

The power transmitter controller 303 may further dynamically control the power level of the drive signal, and thus of the power transfer signal generated by the transmitter coil 103. The power transmitter controller 303 specifically comprises a power loop controller controlling a power level of the power transfer signal in response to power control messages received from the power receiver 105 during the power control phase. The control of the power level may specifically be achieved by controlling a current of the drive signal or more typically by controlling a duty cycle or frequency of the drive signal. In the latter example, the power level may be increased by shifting the frequency closer to a resonance frequency for the output resonance circuit comprising the transmitter coil 103 (and/or a resonance frequency of a resonance circuit of the power receiver 105 which includes the receiver coil 107) and decreased by shifting the frequency further away from the resonance frequency.

In addition, the power transmitter controller 303 may for a given power transfer configuration limit the power level to a maximum power level. This is typically done by limiting the current of the drive signal. The current may be actively limited or in some embodiments, the maximum power limit may be indirect (potentially even unintentional) and e.g. due to a practical limit on the current that can be provided to the driver by a power supply. In some embodiments, the maximum power limit may be a restriction imposed by the control algorithm e.g. in order to ensure that the thermal capabilities of the switch-bridge transistors are not exceeded. For example, for a system wherein the power level is controlled by controlling the frequency and/or duty cycle of the drive signal/power transfer signal, the controller may continuously monitor the power level and adapt the frequency subject to a requirement that the power level does not exceed the maximum power limit for the current power transfer configuration.

In order to receive data and messages from the power receiver 105, the power transmitter 101 comprises a first receiver 305 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the first communicator 305 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

The power transmitter 101 further arranged to transmit data to the power receiver 105 and accordingly comprises a first transmitter 307 which is arranged to transmit data to the power receiver e.g. by specifically modulating the drive signal and thus the power transfer signal using frequency, amplitude, and/or phase modulation.

It will be appreciated that other approaches for communicating data between the power transmitter 101 and the power receiver 105 may be used in other embodiments. For example, in some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

The power transmitter 101 further comprises a first configuration controller 309 which is arranged to control which power transfer configuration the power transmitter 101 is operating in, and thus specifically is arranged to switch the power transmitter 101 between the different power transfer configurations of the set of possible power transfer configurations.

Figure 6:
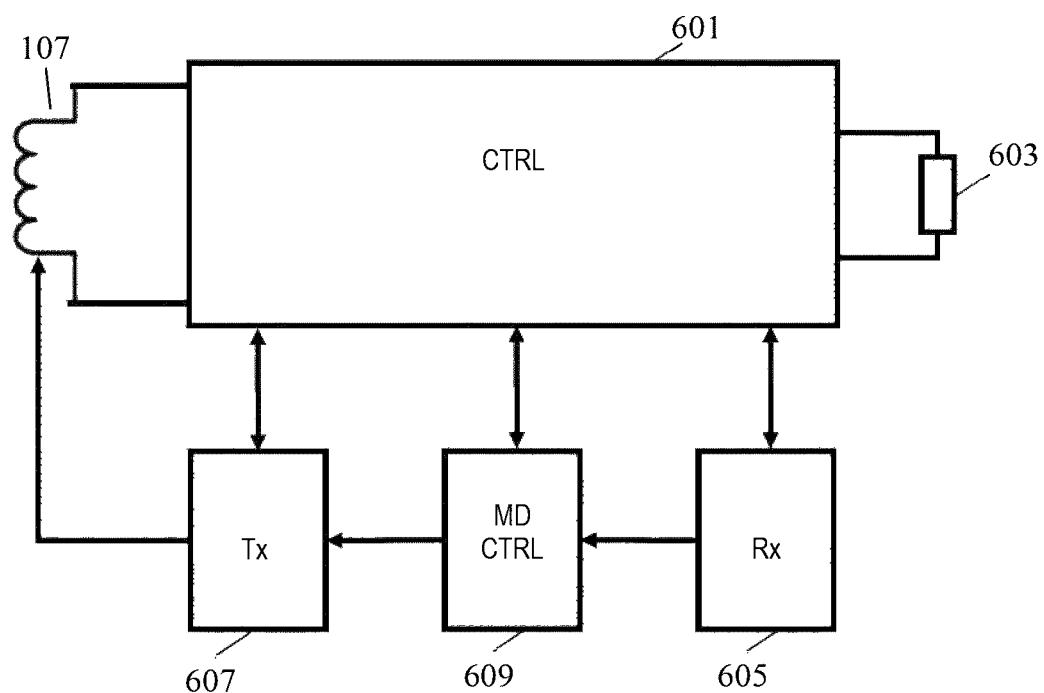
FIG. 6 illustrates an example of elements of a power receiver in accordance with some embodiments of the invention.

FIG. 6 illustrates some exemplary elements of the power receiver 105.

The receiver coil 107 is coupled to a power receiver controller 601 which couples the receiver coil 107 to a load 603. The power receiver controller 601 includes a power control path which converts the power extracted by the receiver coil 107 into a suitable supply for the load. In addition, the power receiver controller 601 may include various power receiver controller functionality required to perform power transfer, and in particular functions required to perform power transfer in accordance with the Qi specifications.

The power receiver 105 further comprises a second receiver 605 which is arranged to receive data transmitted from the power transmitter 101. In the example, the second receiver 605 is arranged to demodulate amplitude, frequency, and/or phase modulation of the power transfer signal as appropriate in order to retrieve data transmitted from the power transmitter.

In order to support communication from the power receiver 105 to the power transmitter 101, the power receiver 105 comprises a second transmitter 607. The second transmitter 607 is arranged to transmit data to the power transmitter by varying the loading of the receiver coil 107 in response to data to be transmitted to the power transmitter 101. The load variations are then detected and demodulated by the power transmitter 101 as will be known to the person skilled in the art.

As previously mentioned, in other embodiments other communication methods may be used, such as e.g. a separate and dedicated short range communication approach such as NFC may be used.

The power receiver 105 further comprises a second configuration controller 609 which is arranged to support the use of different power transfer configurations, and specifically it may support and control the switching of the power transmitter 101 between different power transfer configurations.

Thus, in the system of FIG. 1, a range of different power transfer configurations with different maximum power levels may be used for the power transfer thereby providing for a potentially large range of power levels being supported including quite high power levels. Further, the power transmitter and power receiver may be arranged to dynamically switch between different power configurations. For example, a power transfer operation may initially start at a low power level and then gradually increase the power level to increasingly higher level. For example, charging a large capacity battery may for safety start at lower charging levels and then increase to a potentially high level with a high charge current when it is ensured that this can be safely supported (e.g. ensuring that there are no foreign metallic objects in the neighborhood). Similarly, in many embodiments, the load 603 may be a variable load that has a highly variable power consumption. For example, the load may be a device including an engine running only intermittently. Thus, in many situations, it may be desirable to change between different power transfer configurations with the changes being potentially both unpredictable and in both a power increasing and power decreasing direction.

However, whereas this may allow an improved performance over a larger power range in many embodiments, the Inventor has further realized that there are potential risks and difficulties in changing between different power transfer configurations with different drive voltages for the drive signal.

In particular, a change in the voltage of the drive signal may result in a step/transient in the induced voltage at the receiver coil 107. Thus, the switch from one power transfer configuration to another may cause an undervoltage or an overvoltage condition to occur at the power receiver. For some power receivers and in some situations, such an undervoltage or overvoltage condition may be fully acceptable and not have any significant impact on the operation. However, for other power receivers and/or in other scenarios, the undervoltage and/or overvoltage may have a significant effect and may cause suboptimal or even erroneous operation. Indeed, in some situations, it can even be envisaged that damage to the power receiver may result from an overvoltage condition if suitable precautions are not taken.

As a specific example, the power transmitter may be operating in a 10 W (5 V, 2 A) configuration, with the power receiver controlling its operating point to 8 V, 1 A. When the power transmitter switches to a next higher configuration, such as 12 W (12V, 1 A), the power receiver would initially see a voltage of 12/5*8=19.5 V, 2.4 A, which his far beyond the capability of the power transmitter in this configuration. Accordingly, the power transfer may collapse due to the over voltage or over-power condition being generated.

A similar situation can occur when switching to a lower-power configuration. For example, if the power transmitter operates in a 12V, 1 A configuration, and the power receiver takes only 4 W (e.g. 5 V, 0.8 A), it may be more advantageous to switch to a next-lower configuration on the power transmitter, e.g. 5. V1.5 A. Were this switch to be made without the power receiver preparing, it would experience a voltage of 5/12*5=2.1 V after the switch, which could be too low to sustain its operations (i.e. under voltage). Accordingly, this would result in a collapse of the power transfer as well.

In the approach of FIG. 1, a particular approach for switching between power transfer configurations is implemented which can provide improved performance in many embodiments. The approach allows the power transmitter and the power receiver to interwork in order to carefully control the switching of power transfer configuration, and specifically such that the power receiver is aware of, and typically fully controls, the switching from one power transfer configuration to another thereby preventing unpredicted under- or overvoltage conditions arising.

The approach is based on the power transmitter and power receiver exchanging information in order to control and coordinate changes in the power transfer configuration. The message exchange may specifically allow the power receiver to control the change in the power transfer configuration for the power transmitter such that this can be ensured to proceed without the change resulting in an unacceptable impact at the power receiver (it may e.g. allow the power receiver to compensate for the effects).

Thus, in the example, the power transmitter 101 comprises a first configuration controller 309 which is arranged to control the power transmitter 101 to operate in a power transfer configuration selected from a set of a plurality of power transfer configurations each of which may represent a different combination of a (substantially) constant voltage amplitude of a drive signal for the output circuit including the transmitter coil 103 and a maximum power limit of the power transfer signal/drive signal. The power transmitter 101 is furthermore arranged to transmit a power configuration message to the power receiver 105 which comprises data indicative of a voltage amplitude for the drive signal for one or more power transfer configurations of the set of power transfer configurations.

The power configuration message may specifically include data describing the voltage amplitude for the power transfer configuration for one or more candidate power transfer configurations to which the power transmitter 101 can potentially switch. In many embodiments, the power configuration message may specifically provide voltage amplitude information for a next higher and/or next lower power transfer configuration in a given (e.g. predetermined or previously communicated) sequence of the power transfer configurations that the power transmitter 101 may operate in. For example, the power transfer configurations may be ordered in order of the maximum power limit (and in order of voltage amplitude in case some power transfer configurations have the same maximum power limit), and the power configuration message may indicate the value of the next higher and lower power transfer configuration in accordance with this sequence. The power configuration message may accordingly provide the voltage amplitude for the immediately higher maximum power limit and the immediately lower maximum power limit.

The voltage indication may be given as an absolute value or e.g. as a relative value with respect to the voltage amplitude of the current power transfer configuration.

In the approach, the power receiver 105 may accordingly be provided with information of the power transfer configurations to which the power transmitter can switch.

The second receiver 605 of the power receiver 105 may receive the power configuration message and the power receiver 105 accordingly informed of the potential changes in the power transfer configuration and of the resulting changes in the voltage amplitude. Accordingly, the power receiver has information that allows it to evaluate the result of a consequent change in the power transfer configuration.

Further, the power receiver 105 comprises a second configuration controller 609 which is arranged to detect a power transfer configuration preference for the power transmitter to switch to (one of) the power transfer configuration(s) indicated by the power configuration message.

The desire/request/preference to change the power transfer configuration may be detected in any suitable way and using any suitable algorithm/criterion. The approach does not depend on any specific approach or requirement, or indeed where the preference is determined, by which function, or indeed by which device or apparatus. The approach is thus based on the second configuration controller 609 detecting that there exists a preference for changing the power transfer configuration but is not reliant on where, why, or how this preference originates.

The preference may in many embodiments be determined in the power receiver 105 and specifically by the second configuration controller 609. For example, the second configuration controller 609 may determine that the power transfer is operating close to the maximum power limit for the current power transfer configuration and that there is a demand for increased power, and thus a preference to switch to a power transfer configuration with a higher maximum power limit.

In some embodiments, the preference to switch to a different power transfer configuration may e.g. be determined by the power transmitter and the second configuration controller 609 may detect this preference e.g. in response to a property of the power transfer signal or to communication from the power transmitter. For example, the power transmitter may transmit a request for a power transfer configuration change to the power receiver when the power transmitter determines that such a switch would be desirable. Indeed, in many embodiments, the power transmitter may be arranged to transmit the power configuration message in response to the power transmitter determining that there is a preference to change the power transfer configuration, and thus the power configuration message may itself be a power transfer configuration change request message.

The second transmitter 607 may be arranged to transmit a power transfer configuration change request message to the power transmitter in response to the detection of the power transfer configuration change preference. In many embodiments, the transmission may be conditional, such as specifically conditional on the voltage amplitude for the corresponding power transfer configuration meeting a criterion.

For example, the second configuration controller 609 may in response to detecting that there is a desire to change the power transfer configuration to a given candidate power transfer configuration evaluate if the change to that candidate power transfer configuration will result in an unacceptable undervoltage or overvoltage condition occurring at the power receiver as a result of the switch. As a simple example, the second configuration controller 609 may simply determine whether the ratio between the voltage amplitude of the current power transfer configuration and the voltage amplitude of the candidate power transfer configuration exceeds a threshold which is considered acceptable to the specific power receiver (in the specific circumstances). If so, the second transmitter 607 may proceed to transmit the power transfer configuration change request message to the power transmitter and otherwise no power transfer configuration change request message is transmitted.

In other embodiments, the second transmitter 607 may be arranged to always transmit the power transfer configuration change request message to the power transmitter 101 if a power transfer configuration change preference is detected. In such embodiments, the power receiver 105 may be arranged to adapt an operation or configuration of the power receiver 105 in response to the voltage amplitude of the requested power transfer configuration, and typically in response to a relationship between the voltage amplitude of the requested power transfer configuration and the voltage amplitude of the current power transfer configuration.

For example, if the voltage amplitude change is sufficiently small, no problematic under- or over-voltage condition will occur and accordingly no change in operation or configuration may be needed. However, if the change in voltage amplitude is sufficiently large, this may cause unacceptable transient performance and e.g. result in a transient overvoltage until the power control loop can adapt the power level etc. In such a case, the operation of the power receiver 105 may be adapted by the second configuration controller 609 in preparation for the power transfer configuration change. For example, the input circuit may be isolated from sensitive circuitry which may be susceptible to the overvoltage condition. Specifically, in many embodiments, the may load 603 may be disconnected.

The first receiver 305 may receive the power transfer configuration change request message from the power receiver 105 and in response to receiving this, the first configuration controller 309 may proceed to switch the power transmitter 101 to the new candidate power transfer configuration. In some embodiments, the power transfer configuration change request message may indicate the power transfer configuration, such as e.g. indicate whether the power transmitter 101 is requested to switch to a higher or lower maximum power limit. In other embodiments, this may be implicit, e.g. by there being only one candidate power transfer configuration.

In the system, the change of the power transfer configuration is thus not exclusively performed by the power transmitter 101 but is performed in collaboration between the power transmitter and the power receiver. The power receiver is not only informed of the possible impact of a change in the power transfer configuration but is also in control of whether there is a change in the power transfer configuration. Thus, the change in power transfer configuration may in principle be initiated by the power transmitter or the power receiver but the approach allows for the power receiver to control whether the change in power transfer configuration proceeds or not.

The approach may accordingly allow a flexible approach that effectively can support a large range of power levels by employing a range of different power transfer configurations with different voltages and maximum power limits. The approach allows for this approach to be used with a large range of power transmitters and power receivers without risking e.g. unacceptable overvoltage or undervoltage conditions. Rather, it can be ensured that a given change in power transfer configuration only occurs in a way and if the change is acceptable to the specific power receiver. The approach may thus allow the operation to be adapted to the specific power transmitter and power receiver involved.

The approach may also provide improved backwards compatibility and e.g. allow introduction to systems where some power receivers do not support different power transfer configurations. Such a power receiver will not comprise functionality for generating and transmitting a power transfer configuration change request message and accordingly the power transmitter will not switch the power transfer configuration even if it would consider it expedient to do so.

In some embodiments, the power configuration message may also provide an indication of the maximum power level of the power transfer configuration(s) for which the voltage indication(s) is(are) provided. For example, the power configuration message may explicitly indicate the maximum power level by dedicated data, e.g. giving a value in Watts or providing a reference to one out of a predetermined set of levels.

However, in many embodiments, the power configuration message may not comprise any data defining a maximum power limit for the power transfer configuration(s). In some such embodiments, the power configuration message may in itself be (implicitly) indicative of some information about the maximum power levels. For example, as indicated above, the power configuration message may itself indicate whether there is indeed a higher and/or lower maximum power limit. In some embodiments, the maximum power limits for the set of power transfer configurations are predetermined and known by the power receiver (or e.g. communicated to the power receiver during power transfer initialization). In this case, the power receiver will know the maximum power limit for the next higher and the next lower power transfer configurations and thus the power configuration message implicitly by providing a voltage indication also provides an indication of the maximum power limits.

In many embodiments, the power configuration message may as mentioned specifically provide a voltage amplitude for the power transfer configuration which has maximum power limit being at least one of the next higher maximum power limit or the next lower maximum power limit with respect to the maximum power limit of the current power transfer configuration, or in many embodiments advantageously the power transfer configuration which has maximum power limit being at least one of the next higher maximum power limit and the next lower maximum power limit with respect to the maximum power limit of the current power transfer configuration (thus the voltage amplitude may be provided for both the next higher and the next lower power transfer configurations).

Thus, in many embodiments, the power configuration message may comprise information of the two power transfer configurations that correspond to the next lower and higher power limit available. This may provide an efficient system in which power levels can be flexibly changed while maintaining a low complexity and communication bandwidth. For example, new data need only be communicated once a change in power transfer configuration occurs and data is only required for one or two power transfer configurations. In particular, the communication is limited to very few parameters and there is no need to communicate data for all power transfer configurations that are supported by the power transmitter. This is a substantial advantage in practice as communication from the power transmitter to the power receiver is very slow in wireless power transfer systems such as Qi.

The approach may also provide that step changes in voltage tend to be restricted to smaller steps. For example, a large change in power level will tend to be broken up into a plurality of smaller steps resulting in smaller transients.

In the example, the power transmitter accordingly informs the power receiver of the next higher or next lower voltage configuration being available from the set of power transfer configurations supported by the power transmitter. The power receiver can then request a switch to the available lower or higher configuration. As the power receiver requires higher or lower power, it can step through the configurations. This avoids the power transmitter changing configuration unannounced, which could cause difficulties, or potentially even damage the power receiver.

In many embodiments, the indication of a voltage amplitude may advantageously be provided as a relative difference between the voltage amplitude for the candidate power transfer configuration and the voltage amplitude for the current power transfer configuration, and specifically as the ratio between them. This may be particularly advantageous in embodiments where only the adjacent power transfer configurations are indicated as it may allow a normalization for the value that needs to be communicated thereby allowing a more accurate representation for a given number of bits. For example, if the maximum step in voltage amplitude between adjacent power transfer configurations is a factor of, say, 2, the indication of the ratio needs to cover only a range from e.g. 1 to 2 despite e.g. the set of power transfer configurations covering a voltage amplitude range of, say, a factor of 10.

Figure 7:
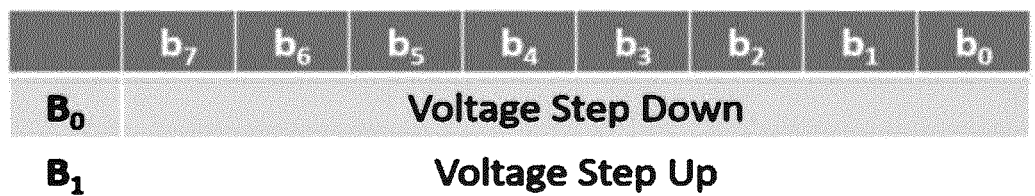
FIG. 7 illustrates an example of a power configuration message in accordance with some embodiments of the invention.

An example of a possible power configuration message is illustrated in FIG. 7. In the example, the power configuration message is named a Power Supply Configuration (PSC) data packet which is transmitted from the power transmitter to the power receiver. In the example, the PSC data packet comprises two fields each being 8 bits. The first field includes a Voltage Step Down data value and the second field includes a Voltage Step Up data value, where the first field indicates the relative change in the voltage amplitude of the drive signal if the power transmitter switches to the next lower power transfer configuration and the second field indicates the relative change in the voltage amplitude of the drive signal if the power transmitter switches to the next higher power transfer configuration. As a specific example, the values may be provided in accordance with the following protocol:

Voltage Step Down: The load voltage will decrease by $\frac{1}{64}$ of this this factor on activating the next lower power transfer configuration (value in the range of 64 . . . 255).

Voltage Step Up: The load voltage will increase by $\frac{1}{64}$ of this factor on activating the next higher power transfer configuration (value in the range of 64 . . . 255).

In some embodiments, a predetermined value of the data field comprising the data indicating the voltage amplitude for a candidate power transfer configuration may be used to indicate that the current power transfer configuration is an extreme power transfer configuration in the sense that it is the highest or lowest power level power transfer configuration.

Thus, a predetermined value for the voltage amplitude data field of the power configuration message may be used to indicate to the power receiver that the set of power transfer configurations supported by the power transmitter does not include any power transfer configuration having a higher maximum power limit. Similarly, a (nother) predetermined value for the voltage amplitude data field of the power configuration message may be used to indicate to the power receiver that the set of power transfer configurations supported by the power transmitter does not include any power transfer configuration having a higher maximum power limit.

For example, for the PSC of FIG. 7, a value of 0 in the fields may indicate that there is no next higher or lower configuration available (i.e. a 0 in the Voltage Step Down field indicates that there is no lower power transfer configuration and a 0 in the Voltage Step Up field indicates that there is no higher power transfer configuration).

In some embodiments, a predetermined value of the data indicative of the voltage amplitude is indicative of there being no change in the voltage amplitude for the candidate power transfer configuration relative to a voltage amplitude for a current power transfer configuration. For example, for the PSC message of FIG. 7, a value of 64 can indicate that the voltage amplitude will not change (but the maximum power limit may change).

Figure 8:
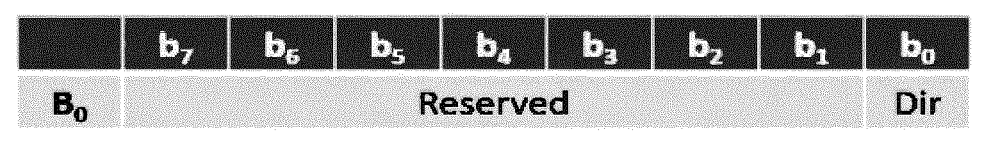

It will also be appreciated that the power transfer configuration change request message may be in any suitable format or using any suitable protocol. An example is provided in FIG. 8. In this example, the power transfer configuration change request message is named a Specific ReQuest/next configuration, SRQ/nc data packet which is transmitted from the power receiver to the power transmitter. In the example, the SRQ/nc message comprises an eight bit data field but only one data bit bo of this data field is used. This data bit indicates the direction of the request, i.e. whether the request is for a power transfer configuration with an increased or decreased maximum power limit.

In many embodiments, the power transmitter may further respond to the power transfer configuration change request message and may specifically in the response acknowledge the request. The response message may specifically indicate a timing of the change of the power transfer configuration. The response message may specifically indicate a time for the change or the timing of the response message may itself be an indication of the timing of the change of the power transfer configuration. For example, the power transmitter may proceed to change the power transfer configuration a predetermined time after the transmission of the response message.

As a specific example, the response message may be one of the following examples:

ACK: The requested new power transfer configuration becomes active within TBD ms after acknowledging the SRQ/en data packet NAK: The power transmitter has denied the request and continues to use the current power transfer configuration (e.g. because the switch would result in exceeding the power supply's capability at the current operating point).

In some embodiments, the power transmitter may initiate the potential change of the power transfer configuration.

For example, the first configuration controller 309 may be arranged to transmit the power configuration message in response to a detection that an operating characteristic of the power transfer meets a criterion, and especially in response to a detection that a current power level of the power transmitter exceeds a threshold where the threshold is dependent on a maximum power limit of the current power transfer configuration.

For example, the first configuration controller 309 may continuously monitor the power level of the drive signal and compare it to the maximum power limit for the current power transfer configuration. If the (e.g. low pass filtered) power level of the drive signal exceeds, say, 90% of the maximum power limit, the first configuration controller 309 may consider that it is likely that it will be appropriate to switch to a power transfer configuration having a higher maximum power limit and it may accordingly proceed to transmit the power configuration message.

As another example, the first configuration controller 309 may monitor the frequency of the drive signal and if this deviates too much from a given resonance frequency of the resonance circuit comprising the transmitter coil 103 (indicating that the drive signal is detuned substantially from the nominal operating point in order to reduce the power of the power transfer signal for the current voltage amplitude) the power transmitter may proceed to transmit the power configuration message.

In this case, the transmission of the power configuration message is accordingly not only providing information on the voltage amplitudes for candidate power transfer configurations but also provides an indication that a change in power transfer configuration is desired/requested by the power transmitter. E.g. in the above two examples, the power configuration message may indicate a desire to switch to a higher maximum power limit power transfer configuration and a desire to switch to a lower maximum power limit power transfer configuration respectively. In some such embodiments, the power configuration message may further include an indication whether a switch to a higher or lower maximum power limit is desired.

In some embodiments, the power receiver may initiate the change in the power transfer configuration. For example, similarly to the approach described for the power transmitter, the second configuration controller 609 may determine the currently extracted power level and compare it to a threshold reflecting the maximum power limit for the current power transfer configuration. Alternatively or additionally, it may measure the frequency of the power transfer signal and detect if this deviates too far from a nominal value.

The detection of such operating characteristics may be a detection of a power transfer configuration change preference and in response the power receiver may transmit a power configuration information request message to the power transmitter. This message may in some embodiments be a request for the power transmitter to transmit a power configuration message and accordingly the power transmitter may transmit the power configuration message thereby providing the power receiver with information of the possibility for changing the power transfer configuration as well as the associated consequence for the voltage amplitude.

Figure 9:
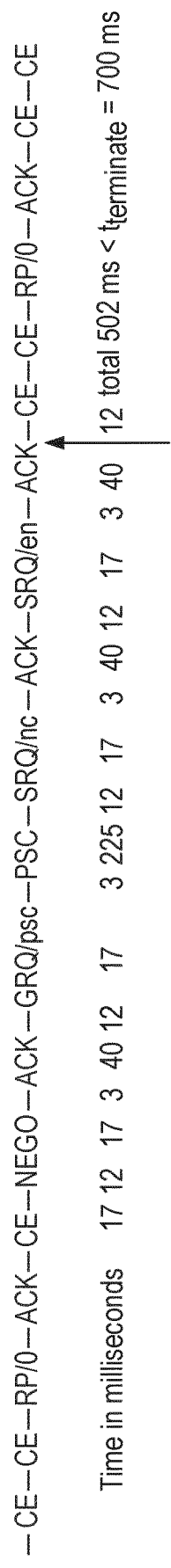
FIG. 9 illustrates an example of a message exchange in accordance with some embodiments of the invention.
Figure 10:
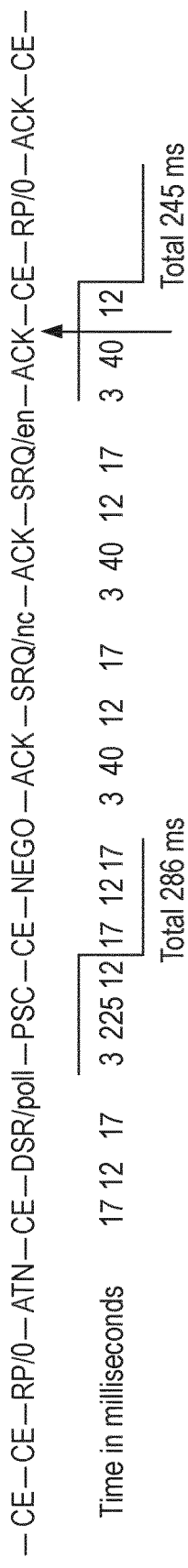
FIG. 10 illustrates an example of a message exchange in accordance with some embodiments of the invention.

A particular example of a possible message exchange of a power receiver initiated change in power transfer configuration is shown in FIG. 9 and a possible message exchange of a power receiver initiated change in power transfer configuration is shown in FIG. 10. The examples include the following messages:

CE (Power) Control Error, used by the power receiver to control its power and voltage levels to appropriate target points.

RP/0 Received Power Packet, used by the power receiver to inform the power transmitter about the amount of power it receives.

ACK Acknowledgement; used by the power transmitter to indicate that it accepts a request.

NEGO Negotiation request; used by the power receiver to initiate a negotiation sequence.

GRQ/psc General ReQuest/power supply configuration; used by the power receiver to request the power transmitter to send a PSC message.

PSC Power Supply Configuration; used by the power transmitter to communicate parameters of the next higher and next lower power configurations.

SRQ/nc Specific ReQuest/next configuration; used by the power receiver to request a next higher or next lower configuration.

SRQ/en Specific ReQuest/end negotiation; used by the power receiver to terminate the negotiation sequence and indicate that the negotiated configuration should become active within TBD milliseconds.

In some embodiments, the power receiver may as previously mentioned determine whether the change in voltage amplitude associated with a switch of the power transfer configuration will cause an unacceptable over- or undervoltage condition and only proceed to transmit the power transfer configuration change request message if this is not the case.

In some embodiments, the power receiver may be arranged to compensate the operation of the power receiver in advance of a switch in the power transfer configuration such that the resulting voltage change becomes acceptable even if it were not without any change in operation.

For example, in advance of the change of the power transfer configuration, the second configuration controller 609 may be arranged to modify the power transfer operation to change the induced voltage in a direction opposite to the change in voltage that will occur in the subsequent change in power transfer configuration.

For example, for a change which increases the voltage amplitude of the drive signal, and thus which will result in an increased transient voltage being induced in the receiver coil 107 when the change in power transfer configuration occurs, the second configuration controller 609 may in advance of the change proceed to reduce the induced voltage over the receiver coil 107. When the change then occurs, the voltage over the receiver coil 107 may increase but due to the previous voltage reduction, this increase may be acceptable and not result in e.g. a damaging overvoltage condition.

In some embodiments, the second configuration controller 609 may be arranged to change the load impedance prior to the switch in the power transfer configuration, and specifically this change in load impedance may be done together with the change in induced voltage.

For example, power transfer may be ongoing with a load of the power transfer signal which is close to the maximum power limit for the current power transfer configuration. Accordingly, there may be a preference to switch to the next higher maximum power limit and this may be detected by the second configuration controller 609 (e.g. based on receiving a power configuration message or based on it itself evaluating the power transfer characteristics). It may accordingly transmit a power transfer configuration change request message to the power transmitter and at the same time proceed to reduce the impedance/resistance resulting in a lower voltage and higher current providing the same power level but at a lower voltage. After the change in the power transfer configuration, the impedance may again be changed to suit the new conditions.

As a specific example, the previously described situation may be considered where the power transmitter may be operating in a 10 W (5 V, 2 A) configuration, with the power receiver controlling its operating point to 8 V, 1 A. When the power transmitter switches to a next higher configuration, such as 12 W (12V, 1 A), the power receiver would initially see a voltage of $12/5*8=19.5$ V, 2.4 A, which his far beyond the capability of the power transmitter in this configuration. Accordingly, the power transfer may collapse due to the over voltage or over-power condition being generated. In order to prevent this situation from occurring, the power receiver would have to control its power level back to e.g. 4 V, 0.5 A before making the switch. In the latter case, after the switch, the power receiver operates at $12*/5*4=9.6$ V, 1.2 A (i.e. 11.5 W, assuming no losses).

A similar example when switching to a lower-power configuration may be where the power transmitter operates in a 12V, 1 A configuration, and the power receiver takes only 4 W (e.g. 5 V, 0.8 A). The system may then switch to a next-lower configuration on the power transmitter, e.g. 5 V, 1.5 A. Were this switch to be made without the power receiver preparing, it would experience a voltage of $5/12*5=2.1$ V after the switch, which could be too low to sustain its operations (i.e. under voltage). Accordingly, this would result in a collapse of the power transfer as well. However, this can be addressed by increasing the induced voltage in preparation of the switch.

The previous examples have focused on embodiments in which the voltage amplitude of the drive signal fed to the output circuit from the driver is constant for any given power transfer configuration. However, the approach may also be suitable for embodiments in which the voltage amplitude is not constant while the power transmitter is operating in a given power transfer configuration.

For example, in some embodiments, the power transmitter may be arranged to operate within a given voltage amplitude range for each power transfer configuration. For example, for each power transfer configuration there may be a given maximum voltage amplitude and thus each power transfer configuration may be associated with a different combination of a maximum power limit and a maximum voltage amplitude (limit) for the drive signal.

In such a case, the voltage amplitude indication being communicated by the power configuration message may indicate the maximum voltage amplitude (limit) for the corresponding candidate power transfer configuration. Accordingly, the power receiver may be arranged to determine a maximum voltage transient or step that may occur when switching from the current power transfer configuration to the candidate power transfer configuration. For example, when switching to a new power transfer configuration, the power transmitter may always start at the maximum voltage amplitude and a power receiver keeping track of the current voltage amplitude (e.g. by comparing the currently induced voltage to the voltage just after the power transmitter switched into the current power transfer configuration) can determine the induced voltage amplitude immediately after the switch to the new power transfer configuration.

Similarly, the voltage amplitude for a given power transfer configuration may have a minimum limit, and the power configuration message may additionally or alternatively indicate the minimum voltage amplitude limit for a candidate power transfer configuration. This may accordingly allow the power receiver to determine the lowest induced voltage that will be experienced immediately after changing of the power transfer configuration.

In some embodiments, the voltage amplitude indicated in power configuration message may not be a maximum and/or minimum voltage amplitude limit but may e.g. be a nominal or initial voltage amplitude. For example, when switching power transfer configuration, the power transmitter may be arranged to initiate the new power transfer configuration with a given voltage amplitude for the drive signal, and this initial voltage amplitude may be transmitted to the power receiver in the power configuration message. The power receiver can accordingly determine the induced voltage immediately after the switch of the power transfer configuration, e.g. by considering the initial voltage amplitude for the candidate power transfer configuration in relation to a current voltage amplitude or in relation to the initial voltage amplitude for the current power transfer configuration. After the switch, the voltage amplitude may subsequently be modified by the power transmitter, but this will typically be so slow that no transients or steps will be experienced by the power receiver.

The voltage amplitude may for example be indicated in the power configuration message as a relative value with respect to e.g. the initial voltage amplitude for the current power transfer configuration. In some embodiments, the voltage amplitude for the candidate power transfer configuration may be provided as a relative indication with respect to a current voltage amplitude. For example, the ratio between the initial voltage amplitude for the candidate power transfer configuration and the current voltage amplitude may be included in the power configuration message. This may facilitate the power receiver determining the voltage step when switching power transfer configuration (e.g. it does not need to keep track of the variations in the voltage amplitude) and is typically feasible due to a very slow variation of the voltage amplitude.

The approach of having a variable voltage amplitude may in particular allow or support implementations where the power level of the power transfer signal is (at least partially) controlled by changing the drive signal voltage amplitude. For example, it may allow an approach where the voltage amplitude of the drive signal is adapted based on power control error messages from the power receiver.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization configuration, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
an output circuit comprising a transmitter coil, wherein the output circuit is arranged to generate a power transfer signal in response to a drive signal;
a driver circuit,
  wherein the driver circuit is arranged to generate the drive signal,
  wherein the drive signal is applied to the output circuit;
a configuration controller circuit,
  wherein the configuration controller circuit is arranged to switch between at least two of a set of power transfer configurations,
  wherein at least a portion of power transfer configurations from the set of power transfer configurations have different combinations of a maximum power limit and a voltage amplitude of the drive signal;
a transmitter circuit,
  wherein the transmitter circuit is arranged to transmit a power configuration message to a power receiver,
  wherein the power configuration message comprises a first data,
  wherein the first data is indicative of a voltage amplitude for a first power transfer configuration,
  wherein the first power transfer configuration is one of the set of power transfer configurations; and
a receiver circuit, wherein the receiver circuit is arranged to receive a power transfer configuration change request message from the power receiver,
  wherein the power transfer configuration change request message comprises a request to change a power transfer configuration of the power transmitter, and
  wherein the configuration controller circuit is arranged to switch the power transmitter circuit to the first power transfer configuration in response to the power transfer configuration change request message.

2. The power transmitter of claim 1, wherein the first data is indicative of a relative difference between the voltage amplitude for the first power transfer configuration and a voltage amplitude for a current power transfer configuration.

3. The power transmitter of claim 2, wherein the first data is indicative of a ratio between the voltage amplitude for the first power transfer configuration and the voltage amplitude for the current power transfer configuration.

4. The power transmitter of a claim 1,
wherein the first power transfer configuration has a maximum power limit,
wherein the maximum power limit is at least one of the next higher maximum power limit and the next lower maximum power limit in relation to a maximum power limit of a current power transfer configuration.

5. The power transmitter of claim 1,
wherein the power configuration message comprises a second data,
wherein the second data is indicative of a voltage amplitude for a second power transfer configuration,
wherein the second power transfer configuration is one of the set of power transfer configurations,
wherein the first power transfer configuration has a first maximum power limit,
wherein the first maximum power limit is a next higher maximum power limit in relation to a maximum power limit of a current power transfer configuration,
wherein the second power transfer configuration having a second maximum power limit,
wherein the second maximum power limit is the next lower maximum power limit in relation to the maximum power limit of the current power transfer configuration.

6. The power transmitter of claim 1, wherein a predetermined value of the first data indicates that the set of power transfer configurations does not comprise a power transfer configuration that has a higher maximum power limit than a maximum power limit of a current power transfer configuration.

7. The power transmitter of claim 1, wherein the configuration controller circuit is arranged to transmit the power configuration message in response to a detection that an operating characteristic of the power transfer meets a criterion.

8. The power transmitter of claim 1,
wherein the configuration controller circuit is arranged to transmit the power configuration message in response to a detection that a current power level of the power transmitter exceeds a threshold,
wherein the threshold is dependent on a maximum power limit of a current power transfer configuration.

9. The power transmitter of claim 1, wherein
the configuration controller circuit is arranged to transmit the power configuration message in response to receiving a power configuration information request message from the power receiver.

10. The power transmitter of claim 1,
wherein configuration controller circuit is arranged to switch the power transmitter to the first power transfer configuration after having transmitted an acknowledgement message to the power receiver,
wherein the acknowledgement message acknowledges a request message received from the power receiver.

11. A power receiver comprising:
an input circuit,
wherein the input circuit comprises a power receiver coil,
wherein the power receiver coil is arranged to extract power from a power transfer signal;
a receiver circuit,
wherein the receiver circuit is arranged to receive a power configuration message from a power transmitter,
wherein the power configuration message comprises data indicative of a voltage amplitude of a drive signal for at least a first power transfer configuration,
wherein the first power transfer configuration is one of a set of power transfer configurations,
wherein each of the set of power transfer configurations have different combinations of a maximum power limit and a voltage amplitude,
wherein the drive signal is applied to an output circuit of the power transmitter,
wherein the output circuit comprises a transmitter coil,
wherein the transmitter coil is arranged to generate the power transfer signal in response to the drive signal;
a configuration controller circuit,
wherein the configuration controller circuit is arranged to detect a power transfer configuration change preference,
wherein the power transfer configuration change preference indicates that the power transmitter is to switch to the first power transfer configuration; and
a transmitter circuit,
wherein the transmitter circuit is arranged to transmit a power transfer configuration change request message to the power transmitter in response to the detection of the power transfer configuration change preference,
wherein the power transfer configuration change request message comprises a request to change a power transfer configuration of the power transmitter, and
wherein the power transfer configuration change request message comprises a request for the power transmitter to switch to the first power transfer configuration.

12. The power receiver of claim 11, wherein the configuration controller circuit is arranged to control the power transfer to change a voltage induced over the power receiver coil in advance of a change in power transfer configuration to the first power transfer configuration.

13. The power receiver of claim 11 wherein the configuration controller circuit is arranged to change a load impedance of the power receiver coil in advance of a change in power transfer configuration to the first power transfer configuration.

14. A method of operating a power transmitter comprising:
applying a drive signal to an output circuit;
generating a power transfer signal in response to the drive signal;
switching between at least two of a set of power transfer configurations, wherein each the set of power transfer configurations have different combinations of a maximum power limit and a voltage amplitude of the drive signal;
transmitting a power configuration message to a power receiver,
wherein the power configuration message comprises a first data,
wherein the first data is indicative of a voltage amplitude for a first power transfer configuration,
wherein the first power transfer configuration is one of the set of power transfer configurations;
receiving a power transfer configuration change request message from the power receiver,
wherein the power transfer configuration change request message comprises a request to change a power transfer configuration of the power transmitter; and switching the power transmitter to the first power transfer configuration in response to the power transfer configuration change request message.

15. A method of operating a power receiver comprising:
extracting power from a power transfer signal;
receiving a power configuration message from a power transmitter,
  wherein the power configuration message comprises a first data,
  wherein the first data is indicative of a voltage amplitude of a drive signal for at least a first power transfer configuration,
  wherein the first power transfer configuration is one of a set of power transfer configurations,
  wherein the power transfer configurations of the set of power transfer configurations have different combinations of a maximum power limit and a voltage amplitude,
  wherein the drive signal is applied to an output circuit of the power transmitter,
  wherein the power transmitter is arranged to generate the power transfer signal in response to the drive signal is applied to the output circuit;
detecting a power transfer configuration change preference, wherein the power transfer configuration change preference indicates that for the power transmitter is to switch to the first power transfer configuration; and
transmitting a power transfer configuration change request message to the power transmitter in response to the detection of the power transfer configuration change preference,
wherein the power transfer configuration change request message comprises a request to change a power transfer configuration of the power.

16. A wireless power transfer system comprising a power transmitter and a power receiver, the power transmitter comprising:
an output circuit comprising a transmitter coil, wherein the output circuit is arranged to generate the power transfer signal in response to a drive signal;
a driver circuit, wherein the driver circuit is arranged to generate the drive signal;
a transmitter configuration controller circuit,
  wherein the transmitter configuration controller circuit is arranged to switch between at least two of a set of power transfer configurations,
  wherein at least a portion of the power transfer configurations wherein from the set of power transfer configurations have different combinations of a maximum power limit and a voltage amplitude of the drive signal;
a first transmitter circuit,
  wherein the first transmitter circuit is arranged to transmit a power configuration message to the power receiver,
  wherein the power configuration message comprises a first data,
  wherein the first data is indicative of a voltage amplitude for a first power transfer configuration,
  wherein the first power transfer configuration is one of the set of power transfer configurations; and
a first receiver circuit, wherein the first receiver circuit is arranged to receive a power transfer configuration change request message from the power receiver,
wherein the configuration controller circuit is arranged to switch the power transmitter circuit to the first power transfer configuration in response to the power transfer configuration change request message;
the power receiver comprising:
an input circuit,
  wherein the input circuit comprises a power receiver coil,
  wherein the power receiver coil is arranged to extract power from the power transfer signal;
a second receiver circuit, wherein the second receiver circuit is arranged to receive the power configuration message from the power transmitter,
a receiver configuration controller circuit,
  wherein the receiver configuration controller circuit is arranged to detect a power transfer configuration change preference for the power transmitter to switch to the first power transfer configuration; and
a second transmitter circuit,
  wherein the second transmitter circuit is arranged to transmit the power transfer configuration change request message to the power transmitter in response to the detection of the power transfer configuration change preference, and
  wherein the power transfer configuration change request message comprises a request to change a power transfer configuration of the power transmitter.

17. A non-transitory computer readable medium having stored thereon instructions that when executed by processing circuitry of a power transmitter causes the power transmitter to perform the method as claimed in claim 14.

18. A non-transitory computer readable medium having stored thereon instructions that when executed by processing circuitry of a power receiver causes the power receiver to perform the method as claimed in claim 15.

19. The method of operating a power transmitter of claim 14,
wherein the power configuration message comprises a second data,
wherein the second data is indicative of a voltage amplitude for a second power transfer configuration,
wherein the second power transfer configuration is one of the set of power transfer configurations,
wherein the first power transfer configuration has a first maximum power limit,
wherein the first maximum power limit is a next higher maximum power limit in relation to a maximum power limit of a current power transfer configuration,
wherein the second power transfer configuration having a second maximum power limit,
wherein the second maximum power limit is the next lower maximum power limit in relation to the maximum power limit of the current power transfer configuration.

20. The method of operating a power receiver of claim 15,
wherein the power configuration message comprises a second data,
wherein the second data is indicative of a voltage amplitude for a second power transfer configuration,
wherein the second power transfer configuration is one of the set of power transfer configurations,
wherein the first power transfer configuration has a first maximum power limit,
wherein the first maximum power limit is a next higher maximum power limit in relation to a maximum power limit of a current power transfer configuration,
wherein the second power transfer configuration having a second maximum power limit, wherein the second maximum power limit is the next lower maximum power limit in relation to the maximum power limit of the current power transfer configuration.

* * * * *

UNITED STATES PATENT AND TRADEMARK OFFICE
CERTIFICATE OF CORRECTION

PATENT NO. : 11,664,687 B2
APPLICATION NO. : 17/422778
DATED : May 30, 2023
INVENTOR(S) : Antonius Adriaan Maria Staring It is certified that error appears in the above-identified patent and that said Letters Patent is hereby corrected as shown below:

In the Claims

Column 24, Line 48, the text reading "indicative of a voltage" should read --indicative of a first voltage--; Line 59, the text reading "power transmitter circuit" should read --power transmitter--.

Column 24, Line 63, the text reading "the voltage" should read --the first voltage--; Line 65, the text reading "voltage amplitude" should read --current voltage amplitude--.

Column 24, Line 67, the text reading "voltage amplitude" should read --first voltage amplitude--; Column 25, Line 1, the text reading "voltage amplitude" should read --current voltage amplitude--.

Column 25, Line 45, the text reading "has a" should read --has a first--; Line 6, the text reading "wherein the maximum power limit is at least one of the" should read --wherein the first maximum power limit is at least one of a--; Line 7, the text reading "the next lower" should read --a next lower--; Line 8, the text reading "a maximum power" should read --a current maximum power--.

Column 25, Line 14, the text reading "indicative of a voltage" should read --indicative of a second voltage--; Line 20, the text reading "in relation to a maximum power" should read --in relation to a current maximum power--; Line 22, the text reading "having a" should read --has a--; Line 24, the text reading "is the next" should read --is a next--; Line 26, the text reading "power limit" should read --current power limit--.

Column 25, Line 32, the text reading "maximum power limit" should read --current maximum power limit--.

Signed and Sealed this
First Day of October, 2024

Katherine Kelly Vidal
*Director of the United States Patent and Trademark Office*